(12) United States Patent
Morrison

(10) Patent No.: US 6,373,515 B1
(45) Date of Patent: Apr. 16, 2002

(54) VARIABLE RESOLUTION TRANSITION PLACEMENT DEVICE

(75) Inventor: Robert D. Morrison, Star, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/635,177

(22) Filed: Aug. 9, 2000

(51) Int. Cl.[7] .................................................. B41J 2/435
(52) U.S. Cl. ........................ 347/249; 347/237; 347/247
(58) Field of Search ................................ 347/235, 237, 347/240, 247, 249, 250, 251; 358/298, 296, 409, 410

(56) References Cited

U.S. PATENT DOCUMENTS

| | | | |
|---|---|---|---|
| 5,212,716 A | 5/1993 | Ferraiolo et al. | 375/373 |
| 5,438,353 A | 8/1995 | Morrison | 347/250 |
| 5,477,330 A | 12/1995 | Dorr | 358/296 |
| 5,760,816 A | 6/1998 | Morrison | 347/247 |
| 5,793,709 A | 8/1998 | Carley | 368/113 |
| 5,990,923 A | 11/1999 | Morrison | 347/252 |
| 6,259,467 B1 * | 7/2001 | Hanna | 347/249 |

* cited by examiner

Primary Examiner—Hai Pham
(74) Attorney, Agent, or Firm—Gregg W Wisdom

(57) ABSTRACT

A variable resolution transition placement circuit in an electrophotographic imaging device allows transitions to be placed within a stream of video data so that the pixel resolution achieved over a scan line is adjustable on a pixel by pixel basis using a system clock. Pixel data defines transition positions relative to a synthesized video clock defining pixel time periods. A converter converts positions of the transitions relative to the synthesized video clock to positions relative to the system clock using a value provided by a synthesized video clock to system clock transform generator. The value can change between synthesized video clock cycles to change the pixel resolution. A synthesized video generator generates values of a synthesized video clock relative to the system clock. Offset values generated from values of the synthesized video clock, the positions of the transitions relative to the system clock, and phase difference values from a phase measuring device are combined to determine the positions at which the transitions will be generated relative to the system clock. The values representing the positions at which the transitions will be generated are stored in a transition queue. The integer portions of these values are decremented on each system clock cycle. When the integer portions of these values reach zero, the fractional portion of these values (representing the position of transitions within system clock clock cycles) are provided to transition generation logic to generate transitions at the specified positions in system clock cycles.

23 Claims, 7 Drawing Sheets

VARIABLE RESOLUTION TRANSITION PLACEMENT DEVICE

FIELD OF THE INVENTION

This invention relates to imaging devices. More particularly, this invention relates to the placement of transitions in a data stream in an imaging device.

BACKGROUND

In an imaging device, such as an electrophotographic printer, copier, or fax machine, that uses a scanning device to expose a photoconductor, imaging data is used to control the application of current to a laser diode to form a latent electrostatic image on the surface of the photoconductor. The laser diode generates a beam that is swept across the surface of the photoconductor by the scanning device. The generation of high quality images can be accomplished by precisely controlling exposure of the photoconductor. The image is quantized into pixels. An improvement in image quality can be accomplished by decreasing the minimum quantization size of the area developed onto the photoconductor for a dimension of the developed area in the direction the beam is swept across the surface of the photoconductor. In addition to decreasing the minimum quantization size of the area developed, improved image quality is also accomplished by precisely controlling the positioning of the developed area with respect to the direction the beam is swept across the surface of the photoconductor. Decreasing the minimum quantization size can be accomplished by decreasing the minimum time period that the laser diode can be turned on during a sweep across the surface of the photoconductor.

In imaging devices using the beam to expose the photoconductor, the beam is generally passed through optical devices to condition it for exposing the photoconductor. After passing the beam through the optical devices, the beam is directed upon the surface of the photoconductor. Typically, the scanning device includes a rotating mirror surface (such as a rotating hexagonal scanning mirror) for sweeping the beam across the photoconductor. The rotation rate of the scanning mirror is tightly controlled. Therefore, the angular sweep rate of the beam will also be tightly controlled. However, because of the geometries involved, if the beam reflected from the scanning device is not conditioned, the sweep rate of the beam along the surface of the photoconductor will vary substantially across the surface of the photoconductor. The beam will sweep at a higher rate near the extremes of the sweep than it will at the central portion of the sweep. Without compensation for this effect, the central portion of the photoconductor can be exposed to a substantially higher optical energy density than the regions near the extremes of the sweep, thereby causing perceivable differences in the images formed on these regions.

To compensate for this sweep rate variation, a flat focusing lens is placed in the optical path between the scanning mirror and the photoconductor. The flat focusing lens is shaped to refract the beam so that the beam is substantially perpendicular to the surface of the photoconductor over length of the sweep and so that, over the length of the sweep, equal rotational movements of the scanning mirror will result in substantially equal movements of the beam across the surface of the photoconductor. By conditioning the beam in this manner, a substantial reduction in the variation of the optical energy density impinging upon the photoconductor over the length of the sweep can be achieved.

However, the flat focusing lens is, relative to the other optical devices in the photoconductor exposure system, costly to manufacture. As a result, the flat focusing lens accounts for a significant portion of the cost of the photoconductor exposure system. Therefore, there is a potential for a substantial cost savings in the imaging device if compensation for the sweep rate variations of the beam can be achieved without using the flat focusing lens.

Another difficulty that arises in imaging devices involves the memory required to store pixel data specifying the image o be formed on the media. Generally, data, such as print data, is used by the imaging device to generate pixel data specifying the image to be formed on the media. For example, an image rendered at a resolution of 1200 pixels per inch requires four times the pixel data to specify an image than the pixel data required to specify an image rendered at a resolution of 600 pixels per inch. Images can include regions having text and regions having pictures. Typically, the image to be generated from the print data is rendered at a uniform pixel density on the media and the rendered image is stored within the imaging device. However, it is generally true that the pixel density used to form relatively high quality text (with the characters having sharp edge definition) is higher than that used to form relatively high quality pictures. As a result, rendering the image at a uniform pixel density for both pictures and text can consume more memory space than would be required if the image could be rendered at a variable pixel density. Having the capability to vary the pixel density so that sections of the image including text are rendered at a higher pixel density than sections of the image including pictures reduces the memory required for storing the equivalent images at a uniform pixel density, thereby reducing cost.

SUMMARY OF THE INVENTION

Accordingly, in an imaging device, a method for generating a transition includes converting a first position of the transition relative to a synthesized clock to a second position of the transition relative to a clock. The method further includes determining an offset between the synthesized clock. Furthermore, the method includes shifting the second position based upon the offset and a phase difference between the clock and a reference signal to form a shifted position and generating the transition at the shifted position.

A variable resolution transition placement device includes a transform generator to generate a selectively variable transform value and a first converter to determine a first position of a transition relative to a clock using a second position of the transition relative to a synthesized clock and using the transform value. The variable resolution transition placement device also includes a synthesized clock generator configured to generate a synthesized clock value and a second converter configured to generate an offset value using the synthesized clock value. In addition, the variable resolution transition placement device includes an adder to combine the first position, the offset value, and a phase difference value to determine a cycle of the clock and a third position within the cycle to place the transition. Furthermore, the variable resolution transition placement device includes a transition queuing device to store and output the third position according to the cycle determined.

An imaging device includes a photoconductor, a rasterizer configured to generate pixel data, and a code generator to generate a binary encoded value corresponding to a position of a transition relative to a synthesized clock using the pixel data. In addition, the imaging device includes a variable resolution transition placement device. The variable resolution transition placement device includes a transform generator to generate a selectively variable transform value and a first converter to determine the position of the transition relative to a system clock using the binary encoded value and the transform value. In addition, the variable resolution transit on placement device includes a synthesized clock generator configured to generate a synthesized clock value, a second converter configured to generate an offset value using the synthesized clock value, and an adder to combine the position of the transition relative to the system clock, the offset value, and a pease difference value to determine a cycle of the system clock and an adjusted position within the cycle to place the transition. Furthermore, the variable resolution transition placement device includes a transition queuing device to store and output the adjusted position according to the cycle determined, transition generation logic to generate the transition according to the adjusted position, and a photoconductor exposure system configured to expose the photoconductor to light according to the transition.

DESCRIPTION OF THE DRAWINGS

A more thorough understanding of embodiments of the transition placement device may be had from the consideration of the following detailed description taken in conjunction with the accompanying drawings in which:

Shown in FIG. 1 is a block diagram representation of an embodiment of an electrophotographic imaging device including an embodiment of a variable resolution transition placement circuit and an embodiment of a photoconductor exposure system.

Figure 2:
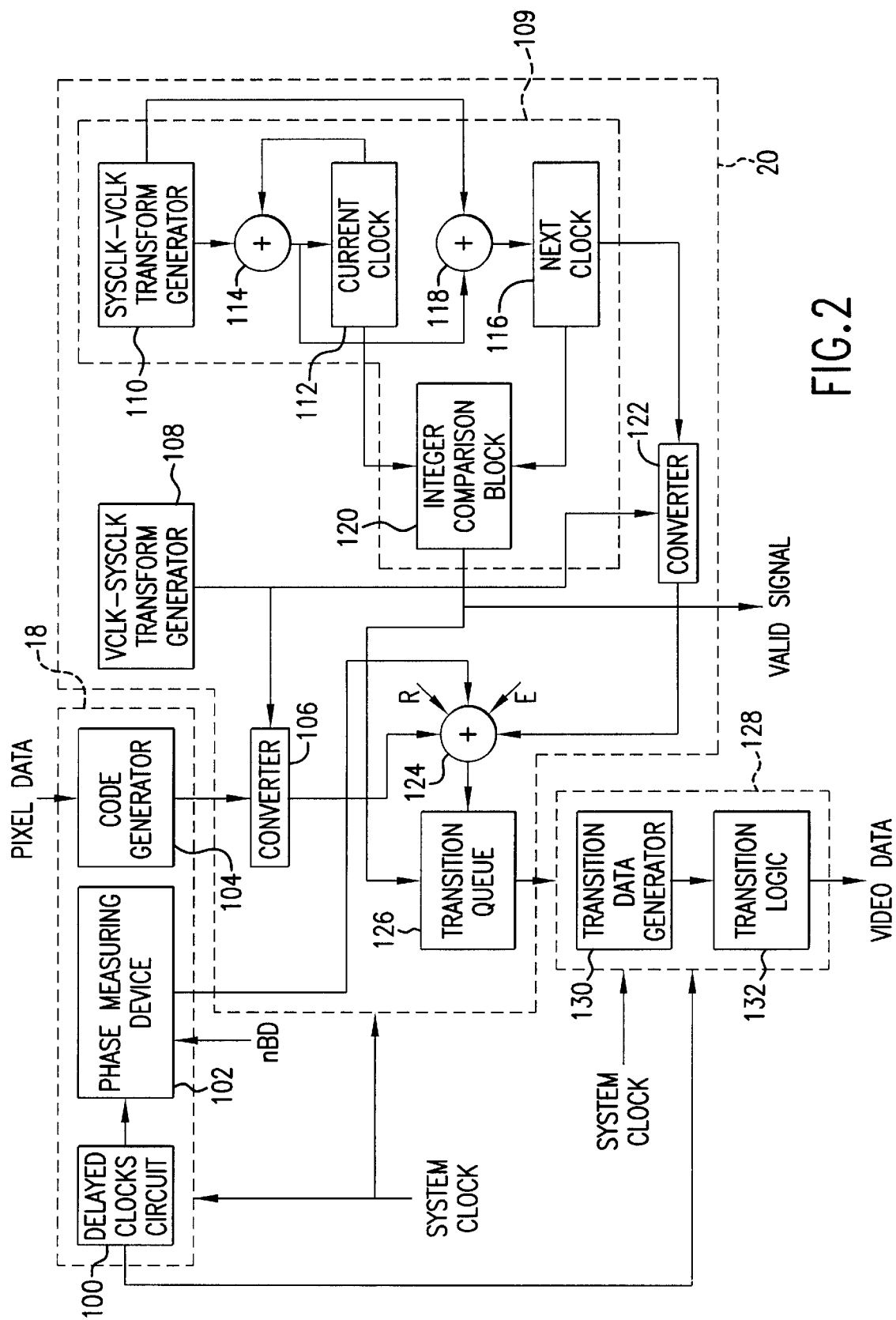
Figure 3:
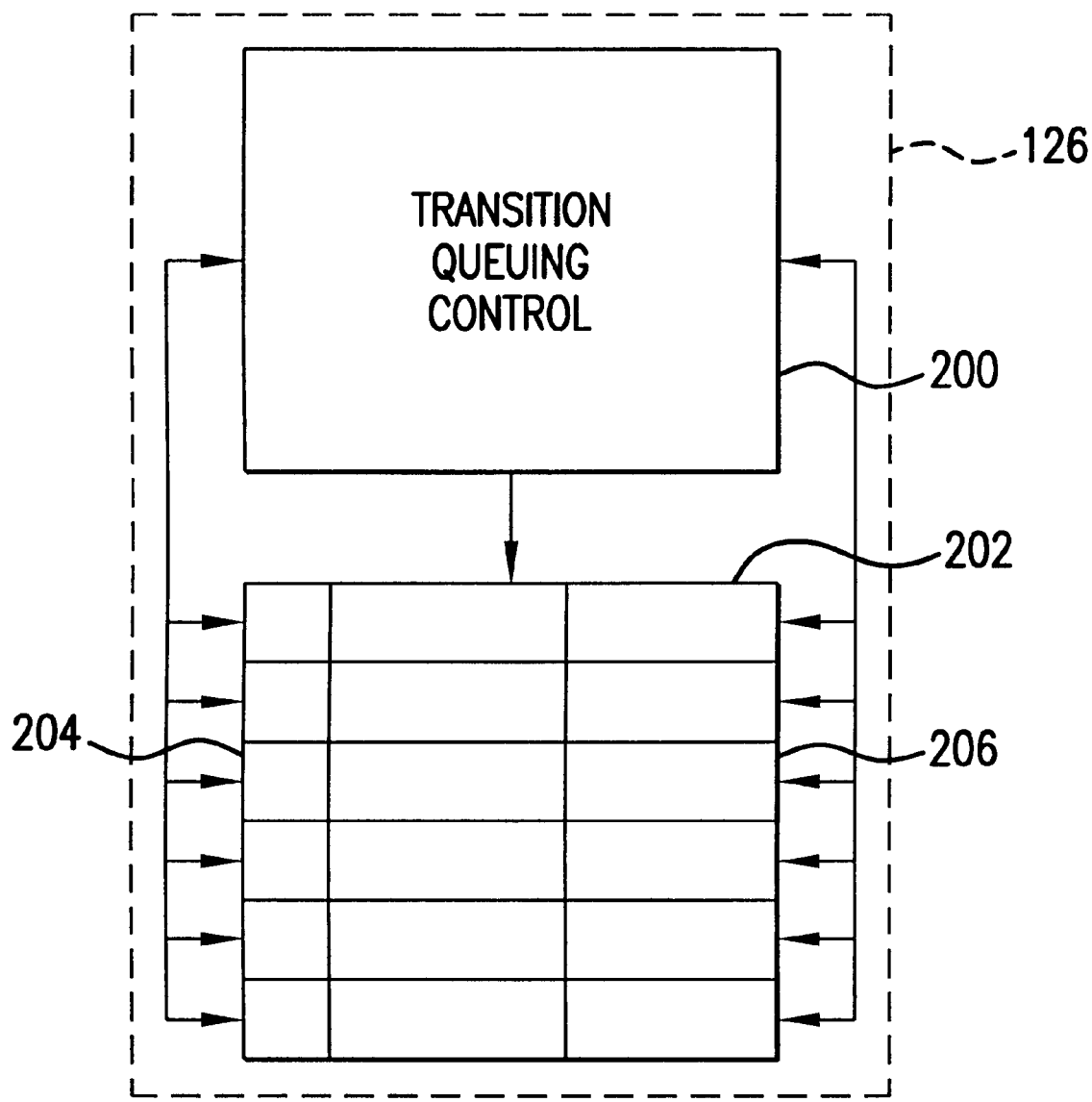

Shown in FIG. 2 is a block diagram of an embodiment of the variable resolution transition placement device Shown in FIG. 3 is a block diagram of an embodiment of a transition queue.

Figure 4:
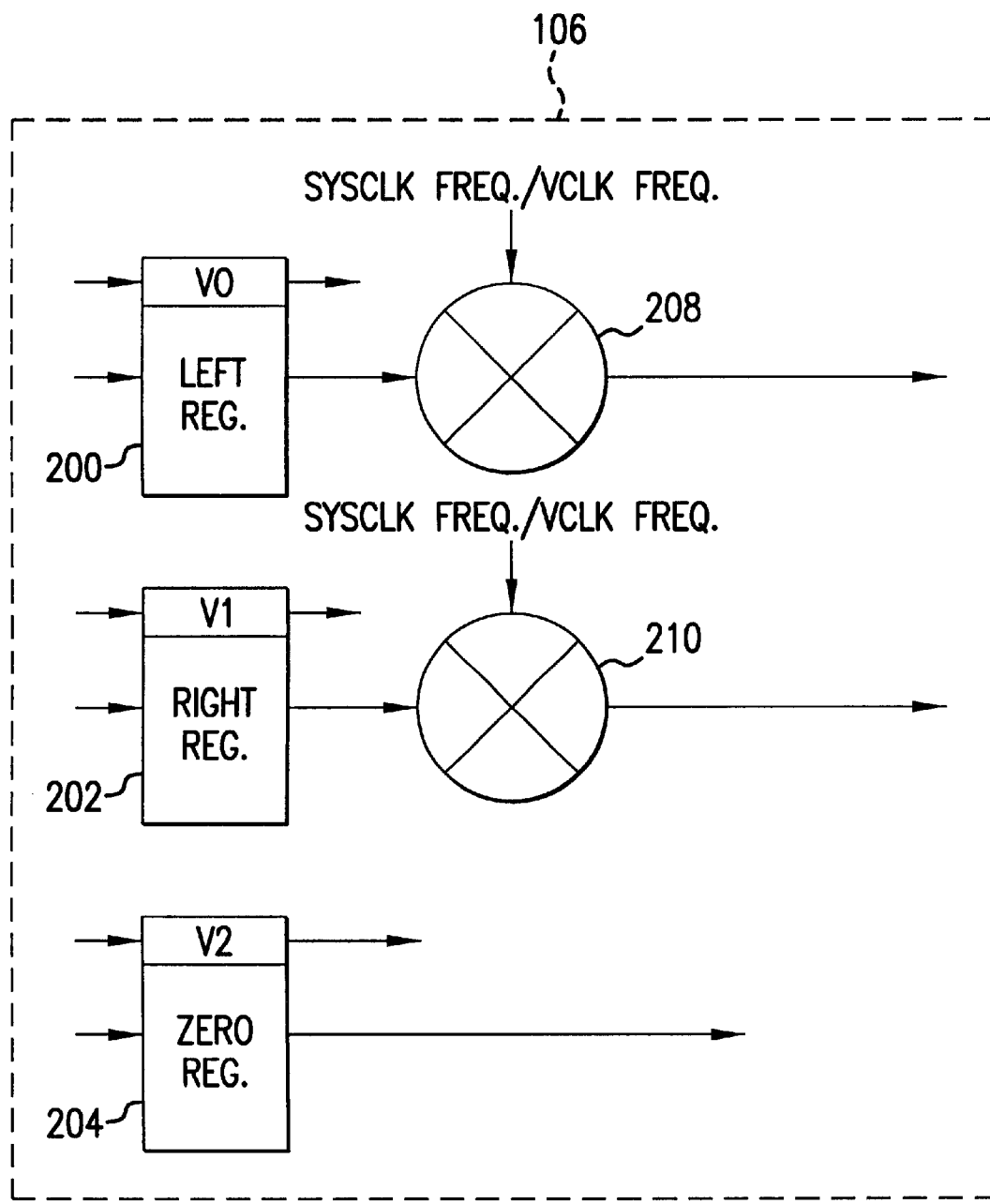

Shown in FIG. 4 is a simplified block diagram of an embodiment of a converter.

Figure 5:
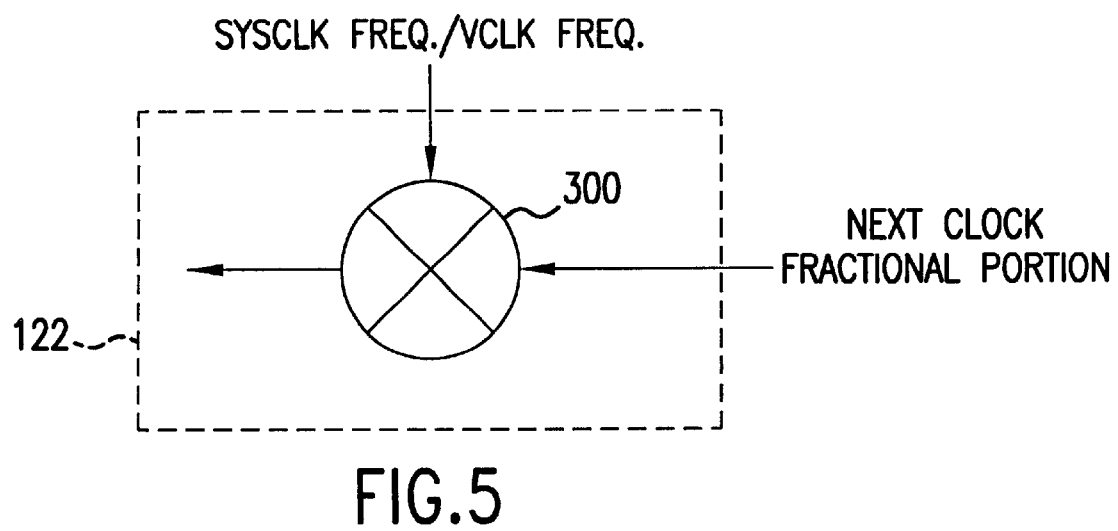

Shown in FIG. 5 is a simplified block diagram of an embodiment of a converter.

Figure 6:
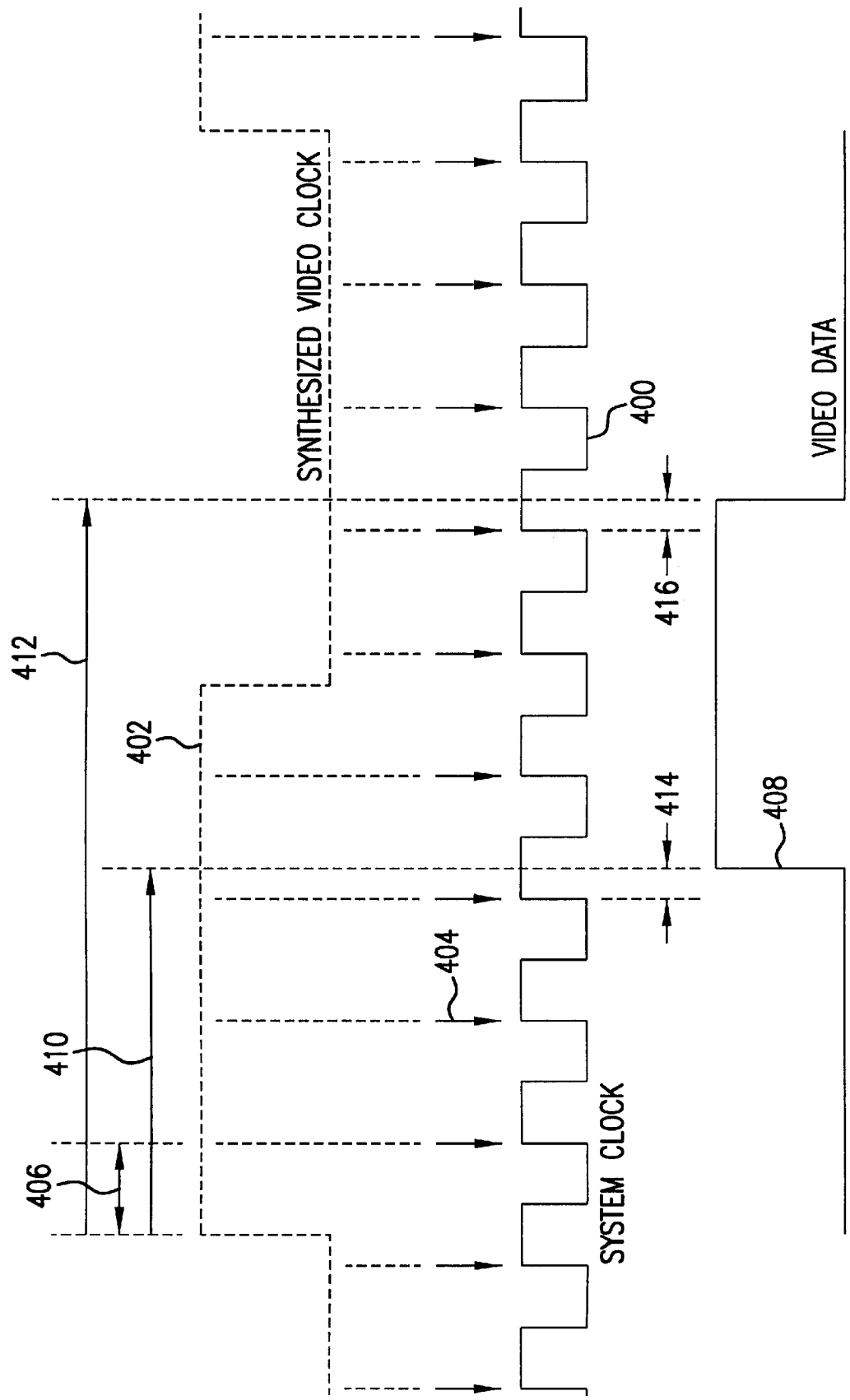

Shown in FIG. 6 is a diagram illustrating a timing relationship between a system clock waveform and the synthesized video clock waveform that would result if it were actually generated.

Figure 7:
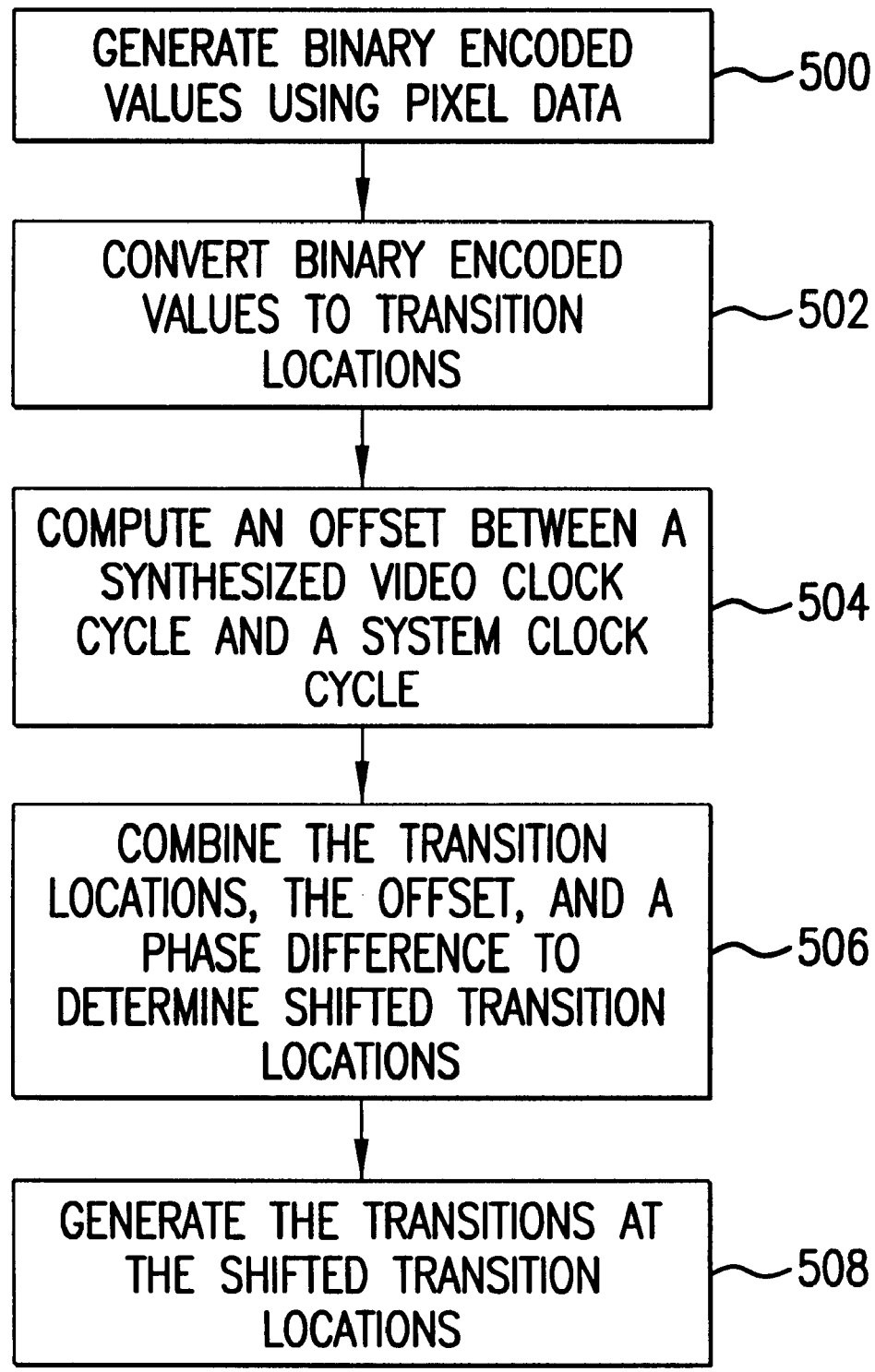

Shown in FIG. 7 is a high level flow diagram for using an embodiment of the variable resolution transition placement circuit to generate a transition.

DETAILED DESCRIPTION OF THE DRAWINGS

Although embodiments of the variable resolution transition placement device will be discussed in the context of an electrophotographic imaging device, such as an electrophotographic printer (either color or monochrome) it should be recognized that the disclosed principles are applicable to other types of imaging devices such as electrophotographic copiers (color or monochrome), scanners, facsimile machines, inkjet printers, or the like. Specifically, embodiments of the variable resolution transition placement device are particularly useful in imaging devices that have an optical path of varying length introducing non-linearities into the imaging operation, thereby allowing for a reduction in the complexity of the optics. For example, in electrophotographic printers, the path followed by the beam to the photoconductor changes length depending upon the position within the scan line. Or, in a scanner, the path that light reflected from a document travels to reach a CCD sensor varies across the width of the document. In addition, embodiments of the variable resolution transition placement device are particularly useful in imaging devices where there is a benefit to forming the portion of an image that includes pictures at a different pixel density than a portion of the image that includes text, thereby allowing for a reduction in memory capacity.

Figure 1:
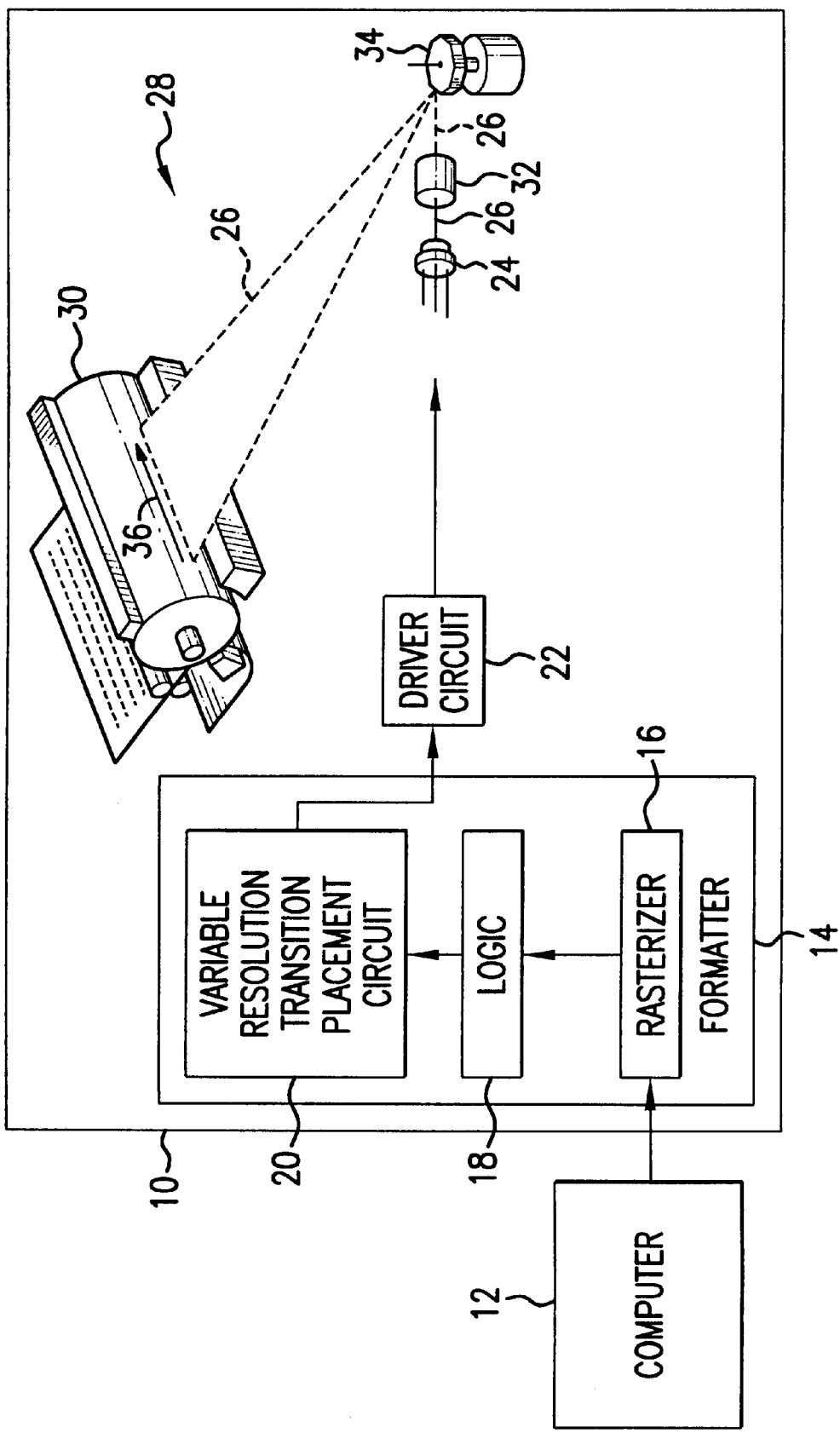

Shown in FIG. 1 is a simplified lock diagram of an embodiment of an electrophotographic imaging device, such as electrophotographic printer 10, including an embodiment of the variable resolution transition placement device. Electrophotographic printer 10 forms an image on media. Computer 12 provides data, including print data, to a formatter 14 included in electrophotographic printer 10. Formatter 14 includes a rasterizer 16 that converts the print data into data used to form the image on the media. Rasterizer 16 may include dedicated hardware for generating the data or it may include a processor executing firmware to generate the data. Logic 18 includes miscellaneous hardware, such as an embodiment of a delayed clocks generator and an embodiment of a code generator, to generate signals and data used by an embodiment of a variable resolution transition placement device, variable resolution transition placement circuit 20. Variable resolution transition placement circuit 20 receives the data from logic 18 and generates a stream of video data that is supplied to driver circuit 22. Driver circuit 22 receives the video data from variable resolution transition placement circuit 20 and controls the flow of drive current through a light source, such as laser diode 24. In response to the drive current, laser diode 24 generates a pulsating beam 26, with the time period of the pulses of the beam corresponding to the time period of the pulses of the video data. An embodiment of a photoconductor exposure system, such as photoconductor exposure system 28, controls the movement of pulsating beam 26 from laser diode 24 across the surface of a photoconductor, such as photoconductor drum 30. Pulsating beam 26 passes through collimating lens 32, is reflected from rotating scanning mirror 34, and impinges upon photoconductor drum 30. Pulsating beam 26 exposes regions on the surface of photoconductor drum 30 that have a dimension (in the direction 36 pulsating beam 26 moves across the surface of photoconductor drum 30) corresponding to time periods of the pulses of the video data. Variable resolution transition placement circuit 20 includes a configuration to compensate for variation in the sweep rate of pulsating beam 26 across photoconductor drum 30 so that areas on the surface of photoconductor drum 30 of the desired size and in the desired location are exposed by pulsating beam 26. In this manner, the operation of variable resolution transition placement circuit 20 is able to electronically compensate for the variation in the angle of pulsating beam 26 as it sweeps across photoconductor drum 30.

In the embodiment of the electrophotographic imaging device shown in FIG. 1, the variable resolution transition placement circuit 20 has the capability to electronically compensate for the variation in the angle of pulsating beam 26 with the need to use a flat focusing lens. However, it should be recognized that there are even advantages to using embodiments of variable resolution transition placement circuit 20 in electrophotographic imaging devices using a flat focusing lens.

The operation of the electrophotographic imaging process makes use of other elements not shown in FIG. 1. Because these other elements are not essential to a description of the embodiments of variable resolution transition placement circuit 20, they have been omitted from FIG. 1. These other elements assist in the formation of a latent electrostatic image on the surface of photoconductor drum 30, the development of toner on, that latent electrostatic image, the transfer of toner onto the media, and the fixing of the toner to the media.

Shown in FIG. 2 is a simplified block diagram of logic 18 and an embodiment of variable resolution transition placement circuit 20. Included in logic 18 is an embodiment of a delayed clocks generator, such as delayed clocks circuit 100. Delayed clocks circuit 100 generates delayed versions of a system clock that are used to sample a reference signal, such as an nBD signal. The nBD signal is an inverted version of a beam detect signal (BD signal). Also included in logic 18 is an embodiment of a phase measuring device, such as phase measuring device 102. Phase measuring device 102 measures the phase difference between the rising edge of the system clock and the nBD signal. An embodiment of phase measuring device 102 is disclosed in copending U.S. patent application Ser. No. 09/534,747, naming Robert D. Morrison and Eugene A. Roylance as inventors, assigned to Hewlett Packard Company, and incorporated by reference into this specification in its entirety.

Variable resolution transition placement circuit 20 generates the video data using the system clock without using a video clock signal. The system clock signal is used elsewhere on formatter 14. For example, processing devices included within rasterizer 16 are clocked using the system clock. Generation of the video data using the system clock provides several advantages. Using the system clock for video data generation eliminates the requirement for the hardware to generate the video clock signal. In addition, using the system clock for video data generation removes the difficulty involved in passing data between two asynchronous clock domains.

To generate the video data at the proper time, the timing of edges of a synthesized video clock are determined with respect to the system clock using the system clock. The synthesized video clock is not actually generated by the variable resolution transition placement circuit 20. However, the number of video clock cycles that would have occurred (both an integer and a fractional part) had there been a video clock signal, are computed for each system clock cycle to form the synthesized video clock. By tracking the edges of the synthesized video clock throughout the scan line in this manner, transitions can be placed at the desired time within the video data stream with respect to the computed edges of the synthesized video clock without generating an actual video clock signal.

The time of one synthesized video clock period substantially equals the time during which pulsating beam 26 is swept across a dimension of an area on photoconductor drum 30 (in the direction of movement of pulsating beam 26 across photoconductor drum 30) corresponding to a width of a pixel. This dimension of the pixel will be referred to as a "pixel width". The time period during which pulsating beam 26 sweeps a distance substantially equal to the pixel width will be referred to as a "pixel time period" and it corresponds in length to a single period of the synthesized video clock. The data supplied by rasterizer 16 to variable resolution transition placement circuit 20 specifying the positions of transitions (if any) during the pixel time period will be referred to as pixel data.

A scan line is formed from a line of contiguous pixels across the surface of photoconductor drum 30 corresponding to a sweep of pulsating beam 26 across the surface of photoconductor drum 30. A left edge of a pixel corresponds to the edge of the pixel width first encountered as pulsating beam 26 sweeps across photoconductor drum 30. A right edge of a pixel corresponds to the edge of the pixel width last encountered as the pulsating beam 26 sweeps across photoconductor drum 30. Variable resolution transition placement circuit 20 includes a configuration that allows it to selectively vary the period of the synthesized video clock, pixel by pixel if desired. By varying the period of the synthesized video clock, variable resolution transition placement circuit 20 has the capability to vary the pixel width from pixel to pixel across the scan line.

Photoconductor drum 30 rotates in a direction that is substantially perpendicular to the direction pulsating beam 26 is swept across photoconductor drum 30. High levels of image quality re achieved by controlling the timing of the video data stream supplied to drive circuit 22 with respect to the nBD signal. Controlling the timing of the video data stream with respect to the nBD signal permits precise alignment of pixels, in the direction of rotation of photoconductor drum 30, for successive scan lines across the width of photoconductor drum 30. To reproduce fine image detail, areas within pixels on photoconductor drum 30 less than a single pixel width are exposed and developed. By achieving precise alignment of corresponding pixels on successive scan lines displaced from each other in the direction of rotation of photoconductor drum 30, fine image detail can be accurately reproduced on the media. Without a high level of precision in the alignment of corresponding pixels on successive scan lines, the fine detail of an image will not be as well resolved.

Logic 18 includes code generator 104. Pixel data received from rasterizer 16 by code generator 104 includes information indicating the number of transitions within a synthesized video clock period and the position of these transitions within the synthesized video clock period with respect to the beginning of the synthesized video clock period. The output of code generator 104 includes binary encoded values generated using the pixel data. These values specify the desired positions of transitions within the synthesized video clock period with respect to the beginning of the synthesized video clock.

In the disclosed embodiment of electrophotographic imaging device 10, the pixel data supplied by rasterizer 16 can specify up to four transitions in each pixel. As will be disclosed in more detail later in this specification, with four transitions specified in a pixel one will occur at the left edge of the pixel and one will occur at the right edge of the pixel. Code generator 104 is configured so that when the pixel data specifies the generation of a transition at the right edge of the corresponding pixel, Code generator 104 will delay this transition so that it is placed at the left edge of the next pixel. Therefore, code generator 104 can generate a maximum of three binary encoded values specifying transitions within a pixel. If the pixel data for the next pixel also specifies a transition at the left edge of the next pixel, these transitions will cancel and code generator 104 will not generate a transition for either the right edge of the current pixel or the left edge of the next pixel.

Hardware and firmware included in formatter 14 maintains a count indicating to which pixel the pixel data supplied by rasterizer 16 corresponds. Pixel data is supplied to variable resolution transition placement circuit 20 in correspondence to this count. That is, the pixel data corresponding to any given pixel in the sweep of pulsating beam 26 is supplied when the count corresponds that particular pixel. In addition, the pixel data for any given pixel is supplied to variable resolution transition placement circuit 20 the correct number of system clock cycles in advance so that the video data generated at the output of variable resolution transition placement circuit 20 for that pixel occurs when pulsating beam 26 is located at the correct position on that pixel. Supplying the pixel data in this manner accounts for the processing time required within variable resolution transition placement circuit 20.

To generate transitions at the proper times within the pixel time periods corresponding to the pixel data, a conversion is done from the synthesized video clock domain to the system clock domain. This conversion translates transitions supplied by code generator 104 from the synthesized video clock domain to the system clock domain. This conversion operation is performed in an embodiment of a converter, converter 106. Converter 106 receives input from an embodiment of a transform generator, such synthesized video clock to system clock transfer function generator 108. Synthesized video clock to system clock transfer function generator 108 could be implemented using a processing device such as a digital signal processor.

Synthesized video clock to system clock transfer function generator 108 generates a value that is the ratio between the system clock frequency and the synthesized video clock frequency for a particular system clock cycle. The value generated by synthesized video clock to system clock transfer function generator 108 can change depending upon the desired transfer function over a scan line. This transfer function could be selected to generate a relatively smooth variation in resolution across the scan line that compensates for the variable sweep rate of pulsating beam 26 across photoconductor drum 30 resulting from the absence of a flat focusing lens. Alternatively, this transfer function could be selected to generate a step change in resolution across the scan line that could, for example, be used to print pictures at one resolution and text at another resolution. Or, this transfer function could be selected to scale an image so that an image having a lower resolution (generated by scanning a unit of media) than the nominal resolution of the imaging device would be generated at the same size as in the unit of media upon which printing was performed. Or, this transfer function could be selected to generate a substantially constant resolution across the scan line. In addition, this transfer function could be selected to achieve an arbitrary resolution versus displacement function over the scan line.

It is important to note that the transfer function is not limited to a smoothly varying transfer function but can be any analytic transfer function. Even discretely varying functions have special utility in imaging devices. However, correctly representing a smoothly continuous frequency transfer function has unique implementation challenges discussed in the following paragraphs.

Consider the case in which it is desired to generate a smoothly varying resolution transfer function over a scan line. The problem confronted is how to generate the value in synthesized video clock to system clock transfer function generator 108 for each system clock cycle so that the desired resolution transfer function is generated with sufficient accuracy. The ultimate measure of the accuracy is the accuracy with which transitions specified by the pixel data are placed within the corresponding pixel. Assume the resolution transfer specifies a first synthesized video clock frequency at the left edge of a pixel and a second synthesized video clock frequency at he right edge of the pixel with a smooth variation between the left edge and the right edge. In addition, assume that a single transition is to be placed within that pixel. The problem is how to determine the correct position of the transition, with respect to the system clock cycles, in a way that accounts for the variation in synthesized video clock frequency over the pixel.

There are several methods of applying the transfer functions. While a mathematically precise transfer function may be applied, the computations are extensive and costly. The visual appearance of the transfer function may be adequately achieved using one of several approximation techniques, such as various interpolation methods.

Determining the correct position of a transition effectively involves conversion between several domains. There is a conversion from the frequency domain to the time domain and then to the spatial domain to determine the transition position within the pixel. Then, there is a conversion from the spatial domain back to the time domain in determining the system clock cycle and the fractional portion of that system clock cycle at which the transition is to be generated.

One way in which to approximately account for the synthesized video clock frequency variation across pixels is to use the ratio between the system clock frequency and the synthesized video clock frequency at the left edge of the pixel for all system clock cycles occurring during that pixel. Another approximation is to average the ratio at the left edge of the pixel and the right edge of the pixel and use this average ratio for all system clock cycles occurring during that pixel.

Yet another approximation involves synthesized video clock to system clock transfer function generator 108 performing a linear interpolation of the synthesized video clock frequency change over the pixel. In this approximation, the ratio between the system clock frequency and the synthesized video clock frequency changes linearly between the value at the left edge of the pixel and the value at the right edge of the pixel. The value of the ratio used for each system clock cycle is computed by determining the line that passes through the value of the synthesized video clock frequency at the left edge of the pixel and the right edge pixel. Then, the ratio is computed using a value for the synthesized video clock frequency that falls upon this line at the beginning of the system clock cycle for which the ratio is computed.

The values of the synthesized video clock frequency at the left edge of a pixel and the right edge of the pixel are determined by the particular transfer function selected for use in synthesized video clock to system clock transfer function generator 108. The transfer function selected depends upon the effect that it is desired to achieve over the scan line. In general, the transfer function used in synthesized video clock to system clock transfer function generator 108 has the effect of shifting, in a non-linear way, the incoming transitions specified with respect to the beginning of synthesized video clock cycles and specifying them with respect to the system clock domain.

Using the value received from synthesized video clock to system clock transfer function generator 108, converter 106 performs a conversion of the binary encoded values generated by code generator 104 to convert them from the synthesized video clock domain to the system clock domain. The unconverted binary encoded values represent the positions of the transitions within a cycle of the synthesized video clock in terms of a representation corresponding to fractional portions of a synthesized video clock cycle. The converted binary encoded values represent the positions of the transitions within a period, or possibly multiple periods of the system clock in terms of integer and fractional parts of system clock periods. The placement of the transitions may cross boundaries of system clock cycles depending upon the position of the transitions within the synthesized video clock period and depending upon the ratio of the system clock frequency to the synthesized video clock frequency for the particular cycle of the synthesized video clock for which the conversion is performed. The determination of which cycle of the system clock the transitions will be placed (accounting for the delay of transitions, if any delay occurs, between periods of the system clock) and where within the cycle, or cycles, of the system clock the transitions will be placed is determined in converter 106.

The conversion performed by converter 106 includes determining the position, in terms of a fractional portion of the system clock period, from a beginning of a system clock cycle using the value received from the synthesized video clock to system clock transfer function generator 108 and computing the number of the system clock cycles into the future (relative to the current system clock cycle) in which the transition is to be generated. The integer portion of the values generated by converter 106 represent the number of the system clock cycles into the future, from the system clock cycle during which converter 106 generates the corresponding integer value, in which the transitions will be placed. The fractional portion of the values generated by converter 106 represent the position, with respect to the beginning of the corresponding system clock cycle in which the transitions will be placed, of the transition.

In performing the conversion in converter 106, the offset between the beginning of the system clock cycles in which the transitions are to be placed and the beginning of the corresponding synthesized video clock cycles is not taken into account. In another portion of the variable resolution transition placement circuit 20, the values (including the integer and fractional portion) generated by converter 106 are added to other offsets computed (such as the offset between the beginning of system clock cycles and the corresponding synthesized video clock cycle) in different parts of the circuit (described later) to determine the system clock cycle and the position within the system clock cycle at which the transitions will be placed.

An embodiment of a synthesized video generator, such as synthesized video generator 109 generates values that represent an integer and fractional portion of the synthesized video clock position on system clock cycles. A transform generator, such as system clock to synthesized video clock transfer function generator 110, generates a value that is the ratio between the synthesized video clock frequency and the system clock frequency for a system clock cycle. The values generated by system clock to synthesized video clock transfer function generator 110 are used to determine the position within synthesized video clock cycles at a beginning of system clock cycles. System clock to synthesized video clock transfer function generator 110 could be implemented using a processing device, such as a digital signal processor. In this embodiment of variable resolution transition placement circuit 20, for a given transfer function selected for a scan line, the values generated in the synthesized video clock to system clock transfer function generator 108 and the system clock to synthesized video clock transfer function generator 110 will be, on a system clock cycle by system clock cycle basis, related to each other as reciprocals.

A storage device, such as current clock register 112, contains a value that represents the position of the synthesized video clock corresponding to the current cycle of the system clock. At the beginning of each system clock period, an adder, such as adder 114, adds the value generated for that system clock cycle by system clock to synthesized video clock transfer function generator 110 to the value stored in current clock register 112 (which, prior to updating at the start of each system clock cycle, represents the value of the synthesized video clock for the previous cycle of the system clock) to determine the position, on the current cycle of the system clock, in the cycle of the synthesized video clock.

The output of adder 114 is stored in current clock register 112. The value held in current clock register 112 includes bits that represent the integer portion and the fractional portion of the synthesized video clock. The number of bits required to represent the fractional part is influenced by the error that can be tolerated in the placement of transitions over the scan line. Ideally, on each system clock cycle the value provided by system clock to synthesized video clock transfer function generator 110 would be exactly equal to the number of synthesized video clock cycles that occur with the passage of each system clock cycle. However, because this value is very likely (though not necessarily) an irrational number, an infinite number of bits would be required to exactly represent this value. Therefore, because the number of bits used to represent the value is limited, the value provided by system clock to synthesized video clock transfer function generator 110 will introduce error in the computation of the synthesized video clock. The error in the synthesized video clock will lead to error in placement of the transitions over the scan line.

To achieve the desired level of accuracy in the placement of transitions over the scan line, the number of bits chosen to represent the fractional portion of the synthesized video clock, value will be selected so that the worst case possible error over the scan line in the synthesized video clock will not result in an unacceptable error in placement of transitions. The error in the generation of the synthesized video clock results from the limited number of bits used to represent the fractional part of the value and round off error from successive additions in adder 114. To determine the worst possible error over the scan line, it is assumed that the error in the generation of the synthesized video clock on each system clock cycle resulting from round off has the same sign. Therefore, the worst case error in the synthesized video clock will occur for the pixel at the end of the scan line. The number of bits used to represent the fractional portion of the synthesized video clock is selected so that the worst case error in the synthesized video clock value (along with sources of error contributed by other portions of variable resolution transition placement circuit 20) will not result in an error in the placement of the transitions greater than a predetermined level.

For example, in an imaging device in which one embodiment of variable resolution transition placement circuit 20 is used, there are at most, approximately ten thousand additions required over a scan line. In this embodiment, to have the capability to locate transitions at time increments of within $1/32$nd of a system clock cycle with a maximum $1/64$th of a system clock cycle error, 22 bits are used (14 bits to achieve the $1/64$th clock period error over, at most, ten thousand additions, 6 bits to represent the fractional part of the value maintained in current clock register 112, and 2 additional bits for margin). The number of bits used in the fractional part of the value in current clock register 112 is influenced by the desired accuracy in the placement resolution (in terms of fractions of the system clock) and the number of additions performed over the scan line. It should be emphasized that a different number of bits could be used to represent the fraction part of the value in current clock register 112. A lower level of desired accuracy and resolution would require fewer number of bits. A greater level of accuracy and resolution would require a greater number of bits.

In addition to having a fractional part, the value in current clock register 112 includes an integer portion. A change in the integer portion of this value between system clock cycles is used to determine if a boundary between successive cycles of the synthesized video clock has been crossed. The number of bits used to represent the integer portion of the value in current clock register 112 is related to the number of synthesized video clock cycles into the future that are concurrently scheduled. In an embodiment of variable resolution transition placement circuit 20, transitions for the next 3 cycles of the synthesized video clock are scheduled. To designate these 3 cycles of the synthesized video clock, 2 bits are used for the integer portion of the value in current clock register 112. Therefore, in this embodiment, 24 bits are used for the integer and fractional part of the value in current clock register 112. A greater or fewer number of bits would be used for the integer portion to schedule transitions for, correspondingly, a greater or fewer number future cycles of the synthesized video clock.

A storage device, such as next clock register 116 maintains a running count of a value that is used to represent the synthesized video clock corresponding to the next cycle of the system clock. Next clock register 116 is coupled to the output of a adder 118 and current clock register 112. After the value in current clock register 112 has been updated at the beginning of the current system clock cycle, adder 118 adds the value generated by system clock to synthesized video clock transfer function generator 110 to the value in current clock at the beginning of the next system clock cycle.

The difference between the values in current clock register 112 and next clock register 116 is equal to the value provided by system clock to synthesized video clock transfer function generator 110 for that system clock cycle over the cycles of the system clock. Because the value generated by system clock to synthesized video clock transfer function generator 110 can change between system clock cycles, the difference between the values stored in current clock register 112 and next clock register 116 can change between system clock cycles. The values in current clock register 112 and next clock register 116 are updated at the beginning of the system clock cycle. However, the values in current clock register 112 and next clock register 116 represent the synthesized video clock on different cycles of the system clock. The value in next clock register 116 represents the synthesized video clock one system clock cycle later than the value in current clock register 112.

As previously mentioned, in one embodiment of variable resolution transition placement circuit 20, two bits are used to represent the integer portion of the value in current clock register 112 and next clock register 116. As the value in system clock to synthesized video clock transfer function generator 110 is added to values in these registers, the integer portion will exceed that which can be represented by two bits. The overflow bits from the addition are dropped. As a result, instead of representing the absolute value of the synthesized video clock, the values in current clock register 112 and next clock register 116 represent the synthesized video clock within several cycles of the synthesized video clock relative to a previous cycle of the system clock.

By generating the value of the synthesized video clock in this manner, the amount of hardware necessary to implement variable resolution transition placement circuit 20 is reduced. Fewer bits are required to represent the integer portion of the values in current clock register 112 and next clock register 116. In addition, the relative value of the synthesized video clock can be tracked through successive additions instead of determining the absolute value of the synthesized video clock at the beginning of each system clock cycle through multiplication. However, it should be recognized that an absolute synthesized video clock value could be generated (at the expense of increased hardware complexity) at the beginning of each system clock cycle. This could be accomplished, for example, by including a sufficient number of bits in current clock register 112 and next clock register 116 for the integer portion to store the total number of synthesized video clock cycles that occur over a scan line. Then, after each addition of the value from the system clock to synthesized video clock transfer function generator 110 for that system clock cycle, the resulting value corresponds to the absolute value of the synthesized video clock.

The values in current clock register 112 and next clock register 116 are used to determine when the boundary between successive synthesized video clock cycles will be crossed. As will be discussed in more detail later, in some situations, placement of transitions at the proper position within a cycle of the synthesized video clock involves anticipating that the boundary between successive synthesized video clock cycles will be crossed before the beginning of the next system clock cycle. The values in current clock register 112 and next clock register 116 are also used to generate a valid signal used to indicate whether values of transition positions generated by other parts of variable resolution transition placement circuit 20 correspond to valid transitions. The valid signal is used by other parts of variable resolution transition placement circuit 20 to determine the value of valid bits associated with transition values that are generated. In addition, the valid signal is used to control the flow of pixel data from rasterizer 16 to code generator 104.

Integer comparison block 120 is used to compare the integer portion of the values stored in current clock register 12 and next clock register 116. This comparison is performed on each system clock cycle. By comparing the integer portion of the values in current clock register 112 and next clock register 116, a determination can be made of the system clock cycle during which the synthesized video clock crosses the boundary between successive system clock cycles. When the integer portions of the value in current clock register 112 and next clock register 116 are equal, this indicates that the beginning of the system clock cycles corresponding to the values in current clock register 112 and next clock register 116 occur during the same cycle of the synthesized video clock. If integer comparison block 120 determines that the integer portions of the values in current clock register 112 and next c lock register 116 are equal, the valid signal is set to a state indicating that valid transition data will not be generated by the other parts of variable resolution transition placement circuit 20. In addition, the valid signal is used to signal rasterizer 16 to stop sending pixel data to code generator 104.

When the integer portions of the value in current clock register 112 and next clock register 116 are not equal, this indicates that during the time interval between the system clock corresponding to the cycle of the synthesized video clock represented by the value in next clock register 116 and the system clock corresponding to the cycle of the synthesized video clock represented by the value in current clock register 112, the boundary between successive synthesized video clock cycles has been crossed. If integer comparison block 120 determines that the integer portions of the values in current clock register 112 and next clock register 116 are not equal, the valid signal is set to a state indicating that valid transition data will be generated by the other parts of variable resolution transition placement circuit 20. In addition, the state of the valid signal indicates to rasterizer 16 that pixel data for the pixel corresponding to the next cycle of the synthesized video clock should be sent to code generator 104.

Transitions are scheduled for placement in a future synthesized video clock cycle at the beginning of a system clock cycle prior to the beginning of the synthesized video clock during which the transitions are to occur. Scheduling is done in this manner so that the transition positions are available to variable resolution transition placement circuit 20 before the beginning of the synthesized video clock cycle during which they are to occur. In an embodiment of variable resolution transition placement circuit 20, the scheduling of transitions is performed so that transitions for the next two successive cycles of the synthesized video clock that are to occur are scheduled. As synthesized video clock cycles occur and the scheduled transitions for those synthesized video clock cycle are generated, transitions for future cycles of the synthesized video clock are scheduled so that transitions for the next two successive cycles of the synthesized video clock are concurrently scheduled.

An embodiment of variable resolution transition placement device 20 includes the capability to generate up to four transitions during a synthesized video clock cycle. In this embodiment, with transitions for two successive cycles of the synthesized video clock scheduled, a maximum of six transitions could be scheduled because transitions specified to occur at the right edge of a pixel will be placed at the left edge of the next pixel (thus only permitting three actual transitions in the current pixel, meaning that a maximum of six transitions can be scheduled in two pixels). Six transitions would be scheduled when the next two successive cycles of the synthesized video clock will each include four transitions (in which case transitions at the right edge of pixel will be moved to the left edge of the next pixel and thereby cancel the transition specified to occur at the left edge of the next pixel). Sufficient storage capacity is included in this embodiment of variable resolution transition placement circuit 20 to hold the data used for generating the scheduled transitions.

In this embodiment of transition placement circuit 20, transitions are scheduled for two cycles of the synthesized video clock to ensure that data will be available for generating transitions at the proper time. Consider the case in which one or more transitions are located near the end of a synthesized video clock cycle and one or more transitions are located near the beginning of the next synthesized video clock cycle. With this situation, it is possible that transitions existing within two cycles of the synthesized video clock need to be generated within the cycle of the system clock that includes the boundary between successive cycles of the synthesized video clock. In addition, it is also possible that the phase difference between the beginning of the synthesized video clock cycle and the system clock cycle may result in the shifting of transitions from the future cycles of the system clock into a system clock cycle in which transitions from the current cycle of the synthesized video clock are to be placed. Or, it is possible that the phase difference between the system clock and the nBD signal results in the shifting of transitions between cycles of the system clock. Therefore, to ensure that the data is available for generating transitions at the desired positions under these circumstances, transitions for two successive synthesized video clock cycles into the future are scheduled.

Converter 122 converts the fractional part of the value stored in next clock register 116 into a position within the corresponding cycle of the synthesized video clock in terms of $1/32$ time increments of a system clock cycle relative to the beginning of the corresponding cycle of the system clock. As will be described in greater detail later in the specification, the value generated by converter 122 is used to account for the offset between the beginning of a system clock cycle and the beginning of the corresponding synthesized video clock cycle in determining the correct position for placement of transitions relative to the beginning of system clock cycles. The fractional portion of the value in next clock register 116 at the beginning of each system clock cycle represents the offset from the beginning of the synthesized video clock cycle in which the system clock cycle occurs to the beginning of that cycle of the system clock. The value of this offset increases as successive cycles of the system clock occur during that cycle of the synthesized video clock.

Converter 122 performs a multiplication on the fractional portion of the value stored in next clock register 116. This multiplication converts the fractional portion of a synthesized video clock cycle into a corresponding value expressed as the number of $1/32$'s of a system clock cycle of offset between the beginning of the synthesized video clock cycle and the beginning of the next occurring system clock cycle. The offset is computed for every system clock cycle within the synthesized video clock cycle. The multiplication performed by converter 122 includes multiplying the fractional value stored in next clock register 116 by value stored in synthesized video clock to system clock transfer function generator 108 for every system clock cycle. The resulting value, which may include an integer portion as well as a fractional portion, represents the offset. The integer portion is the number of system clock cycles of offset and fractional portion is the phase offset within a cycle of the system clock.

An adding device, such as adder 124 performs a signed addition of five types of values supplied by other portions of variable resolution transition placement circuit 20. The first value is the phase difference value generated by phase measuring device 102 is supplied to adder 124. The phase difference is represented as the number of time increments between successive outputs of delayed clocks circuit 100 most closely corresponding to the time between the beginning of the system clock cycle closest in time to the active edge of the nBD signal. The phase difference is a positive value.

The second value supplied to adder 124 includes the values generated by converter 106. As previously mentioned, code generator 104 generates three binary encoded values. If there are three transitions in the corresponding pixel, all of these binary encoded values will be valid. Converter 106 generates three values from the three values supplied by code generator 104. Adder 124 includes 3 adders in a parallel configuration. Each of the three adders adds one of the three values received from converter 106 to one of the other four values supplied to adder 124. Each of the three values generated by converter 106 includes an integer portion (representing the number of the system clock cycle in the future during which the corresponding transition occurs) and a fractional portion (representing the fraction of the system clock cycle at which the corresponding transition occurs). In addition, each of the values supplied by converter 106 is a positive value.

The third value supplied to adder 124 is the value generated by converter 122. The fractional portion of the transition positions supplied by converter 106 are specified with respect to the beginning of the system clock cycle. For each system clock cycle, the offset between the beginning of the synthesized video clock cycle and the system clock cycles occurring during that cycle of the synthesized video clock are computed in converter 122. The third value supplied by converter 122 to adder 124 for each system clock cycle are negative. Because the third value supplied by converter 122 to adder 124 for each system clock cycle is negative, it shifts the transition positions toward the beginning of the synthesized video clock cycle to account for the offset between the synthesized video clock cycle and the system clock cycles.

Consider the case in which three system clock cycles occur during one synthesized video clock cycle and transitions are to be placed at the 20% position and the 80% position within the synthesized video clock cycle. In addition, assume that there is no offset between the beginning of the first system clock cycle occurring during a cycle of the synthesized video clock and that cycle of the synthesized video clock. For the transitions placed at the 20% position, the third value supplied by converter 122 will be zero because there is no offset. For the transition placed at the 80% position, the third value supplied by converter 122 will correspond to an offset of 66% of the synthesized video clock cycle because there will be two cycles of system clock offset from the beginning of the synthesized video clock cycle. The offset of two system clock cycles accounts for the portion of the synthesized video clock cycle that has passed when the output of adder 124 is computed.

The input provided to adder 124 labeled "R" represents a rounding value. The rounding value used in one implementation of variable resolution transition placement circuit 20 is one half of the value of the lowest order bit of the values generated by adder 124. For example, if the fractional portion of the values generated by adder 124 specify the position of the transitions at 1/32 of a system clock cycle resolution, one half of the lowest order bit would correspond to binary value 0.000001 (base 2). The input provided to adder 124 labeled "E" represents a dithering value used to slightly shift the position of the transition, either forward or back in time, in a random fashion from transition to transition for the purposes of controlling radiated emissions. By randomly shifting transition positions, the radiated energy that would have been present at the frequency corresponding to the repetitive occurrence of those transitions at substantially the same positions within system clock cycles is spread over a range of frequencies. This allows compliance with product radiated emission requirements to be more easily achieved.

The output generated by adder 124 is utilized by an embodiment of a transition queuing device, such as transition queue 126 to store information specifying the position of transitions for the next two cycles of the synthesized video clock. The values provided by adder 124 each include an integer portion and a fractional portion. The integer portion specifies the system clock cycle into the future in which a transition is to occur and the fractional portion specifies where within that system clock cycle the transition is to occur. The system clock cycle into the future in which the transition is to occur is specified relative to the time at which integer portion is stored in transition queue 126. Transition queue 126 includes a configuration for storing the integer portion and the fractional portion of each of the values supplied by adder 124. In one embodiment of variable resolution transition placement circuit 20, the fractional portion of the values stored in transition queue 126 specify the positions of the transitions in terms of time increments substantially equal to 1/32 of a system clock cycle. However, it should be recognized that alternative implementations may use other fractional increments.

As each system clock cycle begins, the integer value specifying the system clock cycle in which each of the scheduled transitions are to be placed is decremented within transition queue 126. To illustrate this operation, consider the case in which two transitions are scheduled, one each in the next two synthesized video clock cycles. Furthermore, assume that for these two synthesized video clock cycles the ratio of the system clock frequency to the synthesized video clock frequency is such that at the time converter 106 determines the cycles of the system clock during which the transitions will be placed, those transitions will be placed, respectively one and five system clock cycles into the future. Accordingly, the integer values specifying the future system clock cycles in which each of the transitions will be placed, are, respectively, one and five. At the beginning of each system clock cycle, these integer values are decremented. When the integer values reach zero, transition queue 126 provides a code (or codes if there are multiple transitions that are to be generated during that system clock cycle). The code specifies the position of the transition within the corresponding system clock cycle in terms of a number corresponding to an output of delayed clocks circuit 100.

The code or codes stored in transition queue 126 (representing the position of a transition within the corresponding system clock cycle) are supplied to transition generation logic 128 synchronously with the system clock. Using the code or codes supplied by transition queue 126, transition generation logic 128 generates a transition data value for the system clock cycle corresponding to the code or codes. Each bit of this transition data value specifies the presence or absence of a transition at the positions within the corresponding system clock cycles corresponding to each of the bits. Using this transition data value, transition generation logic 128 generates the transitions in the video data at the desired positions.

Transition generation logic 128 includes transition data generator 130 and transition logic 132. Transition data generator 130 uses the code or codes received from transition queue 126 to generate the transition data value. Transition logic 132 receives the transition data value. Transition logic 132 includes the hardware necessary to generate the video data stream having transitions at positions specified by the pixel data supplied to variable resolution transition placement circuit 20. An embodiment of transition generation logic 128 that would be suitable for use within variable resolution transition placement circuit 20 is disclosed in copending U.S. patent application Ser. No. 09/534,74, previously incorporated by reference in its entirety.

Shown in FIG. 3 is a block diagram of an embodiment of transition queue 126. The embodiment of transition queue 126 includes an embodiment of a transition queuing control device, transition queuing control 200. Transition queuing control 200 includes a configuration to manage the scheduling of transitions. Transition queuing control 200 receives, for each transition to be scheduled, the output from adder 124 specifying the future system clock cycle in which the transition is to occur and the position of the transition within that system clock cycle. The position of the transition within the system clock cycle is encoded within the fractional portion of the values received from adder 124.

In the previously discussed embodiment of variable resolution transition placement circuit 20, the frequency of the system clock was assumed to be greater than that of the synthesized video clock. It should be recognized that embodiments of variable resolution transition placement circuit 20 for which the frequency of the synthesized video clock frequency is greater than the system clock frequency are possible. For these embodiments, multiple groups of the binary encoded values specifying transition positions for a pixel would be supplied on each system clock cycle. In addition, without an increase number of delay taps provided in the delayed clocks circuit, the placement resolution within a cycle of the synthesized video clock would drop.

Consider the case in which the transition positions within system clock cycles are specified with 1/32 of a system clock cycle resolution. In this case, the five bits used to specify the fractional portion specify the number of an output of delayed clocks circuit 100 when bits of the fractional portion are taken as coefficients of non-negative integer powers of two from the most significant bit of the fractional portion to the least significant bit of the fractional portion as: $2^4, 2^3, 2^2, 2^1$, and $2^0$. For example consider a fractional portion having a value (base 10) of 0.8125. This specifies output number 26 of delayed clocks circuit 100 (that is, 26/32 of a system clock cycle). A value of 0.8125 (base 10) corresponds to 0.11010 (base 2). Assigning these coefficients to non-negative integer powers of two as indicated above generates a value of 26. The encoding represents the output of a delayed clocks circuits similarly for other resolutions, such as 1/16 or 1/64 of a system clock cycle. It should be recognized that this encoding from fractional value to tap number works when the number of taps is an integer power of two. However, when the number of taps is non-integer power of two, this encoding scheme will not be applicable. In that case, a translation circuit that receives the fractional part as an input and converts it to a tap number would be used.

Transition queue 126 includes an embodiment of a storage device, transition storage device 202. Transition storage device 202 includes storage elements, of which storage element 204 is representative. Each of the storage elements is used for storing the fractional portions of the values received from adder 124 specifying transition positions within system clock cycles and the integer portions of the values specifying the system clock cycle in which the corresponding transition is to occur. Transition storage device 202 also includes counters, of which counter 206 is representative, associated with each of these storage elements to hold the integer values specifying the future system clock cycles during which the associated transitions are to be placed. The integer values are loaded into the counters by transition queuing control 200. In an embodiment of transition storage device 202, the values in each of the counters are decremented at the beginning of the system clock cycles. Associated with each fractional portion representing the transition position is a valid bit. If the valid bit is asserted, it indicates that the corresponding fractional portion represents a transition that will be generated. If the valid bit is not asserted, it indicates that the corresponding fractional portion does not represent a transition that will be generated. The valid bits are set by transition queuing control 200 based upon the valid signal received from integer comparison block 120. When a boundary between cycles of the synthesized video clock will be crossed, the transitions generated by converter 106 are valid transitions that are scheduled in transition queue 126.

When transition queuing control 200 determines that one or more counter values have reached zero, the corresponding fractional portions for the transition or transitions having valid bits in an asserted state are decoded and sent to the transition generation logic 128 at the beginning of the next system clock cycle. Decoding the fractional portion involves forming a binary encoded value by assigning the bits as non-negative coefficients of two as previously specified. Using the binary coded values, transition generation logic 128 generates the specified transitions at the desired time within the video data stream. The number of bits needed to represent the value specifying the system clock cycle numbers during which transitions will occur depends upon the maximum ratio of the system clock frequency to the synthesized video clock frequency. The larger this ratio is, the greater number of system clock cycles into the future transitions will be scheduled and, therefore, the greater the number of bits needed in the counter to store the binary encoded values generated by converter 106. In one embodiment of transition queue 126 eights bits are used for the counters. It should be recognized that a greater or fewer number of bits may be used depending upon the maximum expected ratio between the system clock cycle and the video clock cycle. By using eight bits for the counters, the embodiment of the variable resolution transition placement circuit 20 has the capability to be used in electrophotographic imaging systems using different synthesized video clock frequencies without requiring a redesign.

An disclosure useful for understanding the operation of an embodiment of code generator 104 is disclosed in copending U.S. patent application Ser. No. 09/534,747, previously incorporated by reference in its entirety. A pixel data byte is supplied to the input of code generator 104 synchronous with the beginning of the system clock. Each pixel data byte defines the pulse shape and pulse width for the corresponding pixel. The term "pulse width" refers to the total fraction (realizing that non-contiguous portions within a single pixel can be exposed) of the pixel in the direction pulsating beam 26 is swept which is to be exposed by pulsating beam 26. The term "pulse shape" refers to the relative positioning of the exposed regions within the pixel. This embodiment of the variable resolution transition placement device permits a left justified pulse, a right justified pulse, a center justified pulse or a split justified pulse. Although four pulse shapes are permitted in this embodiment, it should be recognized that with a different number of bits used a larger or smaller number of pulse shapes could be defined. For a larger number of possible pulse shapes, more bits would be required to define the desired pulse shape.

The pulse shape and pulse width are encoded in the pixel data byte. The two highest order bits of the pixel data byte are used to specify generation of one of four pulse shapes. The left justified pulse is defined by two transitions in the pixel. The first transition is located at the left edge of the pixel and the second transition is located within the pixel at a position determined from the lower order five bits. The center justified pulse is defined by two transitions within the pixel. The positions of the transitions are determined from the lower order five bits. The right justified pulse is defined by two transitions in the pixel. The first transition is located within the pixel at a position determined from the lower order five bits. The second transition is located at the right edge of the pixel. The split justified pulse is defined by four transitions in the pixel. One transition is located on the left edge of the pixel and one transition is located on the right edge of the pixel. The remaining two transitions are located within the pixel at positions determined from the lower order five bits.

The five bits are used to specify the pulse width (with resolution to 1/32 of a pixel width). With all five bits set to a low logic level, the pulse width is zero, corresponding to a white pixel (no exposure within the pixel). With all five bits set to a logic high level, the pulse width is equal to the pixel width, corresponding to a black dot (total exposure within the pixel). With the five bits having values between these extremes, code generator 104 generates transitions within the pixel.

Shown in FIG. 4 is a simplified block diagram of an embodiment of converter 106. Converter 106 receives the binary encoded values from code generator 104 and the value from synthesized video clock to system clock transfer function generator 108. The binary encoded values from code generator 104 specify transition positions within and relative to the beginning of synthesized video clock cycles. Converter 106 converts the binary encoded values from the synthesized video clock domain to the system clock domain. As previously mentioned, an embodiment of code generator 104 can generate binary encoded values corresponding to four pulse shapes.

Three of the pulse shapes (split justified, left justified, and right justified) include at least one transition at either the beginning or end of a synthesized video clock pulse. For these three pulse shapes the position of at least one of the transitions (and maybe two of the transitions) in the pulse shape, in terms of fractional portions of a system clock cycle will be zero because the transition or transitions will be located on either or both of the left edge or the right edge of the synthesized video clock. For these transitions, no computation is required in converter 106.

The binary encoded values generated by an embodiment of code generator 104 specify the position of the transitions within a synthesized video clock cycle expressed as a fraction of a synthesized video clock cycle. For example, a transition located at 26/32 of a synthesized video clock cycle would correspond to a binary encoded value of 11010. For a transition located at the left edge of a synthesized video clock cycle (0/32), the corresponding binary encoded value would be 00000. A transition located at the right edge of a synthesized video clock cycle (32/32), is moved to the left edge of the next pixel by code generator 104. Therefore, for transitions specified by code generator 104 to be placed at the left edge of the current pixel or the left edge of the next pixel, no multiplication is required because the result will zero. By always placing the binary encoded values from code generator 104 corresponding to transitions at the left edge of the pixel and the right edge of the pixel (moved to the left edge of the next pixel) into the same registers, the correct values can be assigned for the output from converter 104 without requiring a multiplication.

Converter 106 includes input registers 200–202 for storing the binary encoded values provided by code generator 104. The binary encoded value for transitions located between the left edge of the pixel and the center of the pixel is stored in left register 200. The binary encoded value for transitions located between the center of the pixel and the right edge of the pixel is stored in right register 202. Zero register 204 is the register for the binary encoded value corresponding to a transition placed at the left edge of the pixel. Because the binary encoded value in zero register 204 will always be zero, a single valid bit could be used for this value. Associated with each of the registers 200–204 are valid bits V0–V2 also generated by code generator 104. If the binary encoded value generated by code generator 104 correspond to valid transitions, the corresponding valid bits V0–V2 will be asserted. Otherwise, code generator 104 will generate valid bits V0–V2 in a non-asserted state to indicate that the binary encoded values corresponding to valid bits V0–V2 in the non-asserted state are not valid transitions. Converter 106 also includes multiplier 208 and multiplier 210. Multiplier 208 and multiplier 210 each receive the value provided by synthesized video clock to system clock transfer function generator 108 for each synthesized video clock cycle. Multiplier 208 and multiplier 210 multiply the value provided by synthesized video clock to system clock transfer function generator 108 by, respectively, the values in input register 200 and input register 202. The result, along with the corresponding valid bits V0–V1 are supplied at the output of converter 106. The value in zero register 204 corresponds to the transition (if there is one) placed at the left edge of the pixel. Since the binary encoded value in input register 204 will be zero, no multiplication is required for this value. Accordingly, this value is passed through without multiplication along with valid bit V2.

Shown in FIG. 5 is a simplified block diagram of an embodiment of converter 122. Converter 122 includes multiplier 300 to receive the fractional portion of the value in next clock register 116 and to receive the value generated by synthesized video clock to system clock transfer function generator 108. Multiplier 300 multiplies these two values on each system clock cycle to generate the offset between the beginning of the synthesized video clock cycle and that system clock cycle.

Shown in FIG. 6 is a diagram illustrating a timing relationship between a system clock waveform 400 and the synthesized video clock waveform 402 that would result if it were actually generated. Synthesized video clock waveform 402 is shown as a dashed line to emphasize that it is a virtual waveform. That is, synthesized video clock waveform 402 is not actually generated. Rather, the position of synthesized video clock waveform is computed for each system clock cycle. Although the frequency of system clock waveform 400 is shown as greater than the frequency of synthesized video clock waveform 402, as previously mentioned, the opposite could be true. The arrows, of which arrow 404 is exemplary, correspond to the positions at which values of synthesized video clock waveform 402 are computed. An offset 406 (the value of which is computed by converter 122) between the beginning of a synthesized video clock cycle and the beginning of a system clock cycle is also shown in FIG. 6.

Also shown in FIG. 6 is an exemplary video data waveform, video data waveform 408 for a single pixel. This is included for the purpose of showing the timing relationships between system clock waveform 400, synthesized video clock waveform 402, and video data waveform 408. Video data waveform 408 for the pixel shown corresponds to the generation of a center justified pulse. The left edge of the center justified pulse occurs a time interval 410 after the left edge of the synthesized video clock. The right edge of the center justified pulse occurs a time interval 412 after the left edge of the synthesized video clock. The position of the left edge and right edge of the center justified pulse with respect to the beginning of system clock cycles are shown by, respectively time interval 414 and time interval 416.

Shown in FIG. 7 is a high level flow diagram for using an embodiment of the variable resolution transition placement circuit 20 to generate a transition. First, in step 500 code generator 104 generates binary encoded values using pixel data received from rasterizer 16. These binary encoded values represent the positions of transitions relative to the beginning of a cycle of the synthesized video clock. Next, in step 502, converter 106 converts these binary encoded values to transition positions relative to the system clock. Then, in step 504, converter 122 computes an offset between the beginning of a synthesized video clock cycle and a system clock cycle. Next, in step 506, adder 124 combines the transition positions, the offset and a phase difference previously determined by phase measuring device 102 to determine shifted transition positions and stores the shifted transition positions in transition queue 126. Finally, in step 508, transition generation logic 128 generates the transitions after receiving the shifted transition positions on the correct cycle of the system clock.

Although an embodiment of the variable resolution transition placement device has been illustrated, and described, it is readily apparent to those of ordinary skill in the art that various modifications may be made to this embodiment without departing from the scope of the appended claims.

What is claimed is:

1. In an imaging device, a method for generating a transition, comprising:

converting a first position of the transition relative to a synthesized clock to a second position of the transition relative to a clock;

determining an offset between the synthesized clock and the clock;

shifting the second position based upon the offset and a phase difference between the clock and a reference signal to form a shifted position; and generating the transition at the shifted position.

2. The method as recited in claim 1, wherein:

converting the first position includes multiplying the first position by a selectively variable transform value relating the clock to the synthesized clock for each cycle of the synthesized clock.

3. The method as recited in claim 2, wherein:

shifting the second position includes subtracting the offset from the second position and adding the phase difference to the second position.

4. The method as recited in claim 3, wherein:

the synthesized clock corresponds to a synthesized video clock;

the clock corresponds to a system clock; and the reference signal corresponds to a beam detect signal.

5. The method as recited in claim 4, wherein:

the transform value substantially equals a ratio of a frequency of the system clock to a frequency of the synthesized video clock.

6. The method as recited in claim 5, further comprising:

generating the synthesized video clock before determining the offset between the synthesized video clock and the system clock; and determining the phase difference before generating the transition.

7. The method as recited in claim 6, wherein:

the transform value corresponds to a first transform value; and generating the synthesized video clock includes adding a second transform value, substantially equal to a ratio of the frequency of the synthesized video clock and the frequency of the system clock on a current cycle of the system clock to the synthesized video clock on a previous cycle of the system clock.

8. The method as recited in claim 7, wherein:

determining the offset includes multiplying a fractional portion of the synthesized video clock by the first transform value.

9. The method as recited in claim 8, wherein:

generating the transition includes decrementing an integer portion of the shifted position in a first cycle of the system clock; and generating the transition includes converting a fractional portion of the shifted position into a position relative to a beginning of a second cycle of the system clock in terms of a number of fractional portions of the second cycle of the system clock.

10. The method as recited in claim 9, wherein:

generating the transition includes sending the shifted position to transition generation logic.

11. The method as recited in claim 10, further comprising:

generating the first transform value by interpolating between a first value of a transfer function at a beginning of a cycle of the synthesized video clock and a second value of the transfer function at an end of the cycle of the synthesized video clock, where generating the first transform value occurs prior to converting the first position.

12. A variable resolution transition placement device, comprising:

a transform generator to generate a selectively variable transform value;

a first converter to determine a first position of a transition relative to a clock using a second position of the transition relative to a synthesized clock and using the transform value;

a synthesized clock generator configured to generate a synthesized clock value;

a second converter configured to generate an offset value using the synthesized clock value;

an adder to combine the first position, the offset value, and a phase difference value to determine a cycle of the clock and a third position within the cycle of the clock to place the transition; and a transition queuing device to store and output the third position according to the cycle of the clock determined.

13. The variable resolution transition placement device as recited in claim 12, wherein:

the transform generator includes a configuration to generate the transform value as a ratio of a frequency of the clock and a frequency of the synthesized clock.

14. The variable resolution transition placement device as recited in claim 13, wherein:

with the cycle of the clock corresponding to a first cycle, the transform generator includes a configuration to generate the transform value for a second cycle of the clock according to the frequency of the synthesized clock determined for the second cycle of the clock.

15. The variable resolution transition placement device as recited in claim 14, wherein:

a value corresponds to the second position and defines the transition relative to a beginning of a corresponding cycle of the synthesized clock; and the first converter includes a configuration to determine the first position by multiplying the value by the transform value.

16. The variable resolution transition placement device as recited in claim 15, wherein:

an integer value represents the first cycle of the clock in which to place the transition and a fractional value represents the third position; and the transition queuing device includes a configuration decrement the integer value and output the fractional value when the integer value equals zero.

17. The variable resolution transition placement device as recited in claim 16, wherein:

with the transform generator corresponding to a first transform generator to generate a first transform value corresponding to the transform value, the synthesized clock generator includes a second transform generator to generate a second transform value as a ratio of the frequency of the synthesized clock and the frequency of the clock for the second cycle of the clock;

a first register to store a first synthesized clock value;

a first adder to add the second transform value to the first synthesized clock value to generate the first synthesized clock value for the second cycle of the clock;

a second register to store a second synthesized clock value;

a second adder to add the first synthesized clock value to the second transform value to generate the second synthesized clock value for a third cycle of the clock; and an integer comparison block to compare integer portions of the first synthesized clock value and the second synthesized clock value and to assert a valid signal for inequality of the integer portions.

18. The variable resolution transition placement device as recited in claim 17, wherein:

the first transform generator includes a configuration to generate the first transform value by interpolating between a first value of a transfer function at a beginning of a cycle of the synthesized clock and a second value of the transfer function at an end of the cycle of the synthesized clock.

19. An imaging device, comprising:

a photoconductor;

a rasterizer configured to generate pixel data;

a code generator to generate a binary encoded value corresponding to a position of a transition relative to a synthesized clock using the pixel data;

a variable resolution transition placement device including a transform generator to generate a selectively variable transform value, a first converter to determine the position of the transition relative to a system clock using the binary encoded value and the transform value, a synthesized clock generator configured to generate a synthesized clock value, a second converter configured to generate an offset value using the synthesized clock value, an adder to combine the position of the transition relative to the system clock, the offset value, and a phase difference value to determine a cycle of the system clock and an adjusted position within the cycle to place the transition, and a transition queuing device to store and output the adjusted position according to the cycle determined;

transition generation logic to generate the transition according to the adjusted position; and a photoconductor exposure system configured to expose the photoconductor to light according to the transition.

20. The imaging device as recited in claim 19, further comprising:

a phase measuring device configured to generate the phase difference value according to a time difference between a beginning of a cycle of the system clock and a transition of a beam detect signal; and a delayed clocks circuit to generate a plurality of delayed system clocks for the phase measuring device and the transition generation logic.

21. The imaging device as recited in claim 20, wherein:

the transform generator includes a configuration to generate the transform value as a ratio of a frequency of the system clock and a frequency of the synthesized clock.

22. The imaging device as recited in claim 21, wherein:

with the cycle of the system clock corresponding to a first cycle, the transform generator includes a configuration to generate the transform value for a second cycle of the system clock according to the frequency of the synthesized clock determined for the second cycle of the system clock.

23. The imaging device as recited in claim 22, wherein:

the transform generator includes a configuration to generate the transform value by interpolating between a first value of a transfer function at a beginning of a cycle of the synthesized clock and a second value of the transfer function at an end of the cycle of the synthesized clock.

* * * * *